Patented Jan. 10, 1950

2,494,297

UNITED STATES PATENT OFFICE 2,494,297

COMPOSITE RESINOUS COATED METAL AND PROCESS OF MAKING SAME

Charles H. Hempel, Manitowoc, Wis., assignor to Heresite & Chemical Company, a corporation of Wisconsin No Drawing. Application March 16, 1945, Serial No. 583,173

4 Claims. (Cl. 117—75)

This invention relates to a composite resinous coating and method of forming the same and more particularly to a metal base having directly applied thereto a primer coating of oil-free phenol formaldehyde resin having high corrosion resistance and directly upon this primer a coating of formaldehyde-amine resin.

Phenol formaldehyde coating may be made which are extremely corrosion resistant, particularly when oil-free and prepared as described in Hempel Patent No. 2,198,939. Such films, however, have poor color retention. The amine-formaldehyde resins such as urea-formaldehyde have good color stability, but poor chemical resistance and are even affected by water at high temperatures. The present invention produces a composite coating having considerably greater corrosion and water resistance than the amine resins and also having good color retention.

In applying the invention, the surface to be coated, if metal, is sand blasted or acid etched, for example as described in Hempel Patent No. 2,137,988 or in co-pending patent application No. 506,727, now Patent No. 2,420,134. One coating of an oil-free phenol formaldehyde resin is then applied by spraying or by dipping and the coated object baked at a temperature and for a time to convert the resin from the A stage to the C stage. Suitably this may be one-half hour at 375° F.

One or more surface coatings of a formaldehyde-amine resin is then applied directly to the phenol formaldehyde surface. These coatings are likewise applied by spray or dip. The coated object is then baked sufficiently to polymerize the coating. If more than one layer of coating is applied, it is preferred not to convert the amine resin to the C stage until the application of the last coat. This usually required about 30 minutes at 150° C.

The resulting material has excellent adhesion to the base and to the intermediate coatings and can be exposed to boiling water, soap solutions or mild alkalies for indefinite periods of time. It is not discolored when exposed to ultraviolet rays at temperatures up to 250° F.

A metal coated with an amine-formaldehyde resin film without the primer and exposed to a boiling 2% soap solution (ordinary sodium-fatty acid soap) is easily marked or scratched after 30 minutes' exposure. The present product does not scratch even after 24 hours' exposure to such a boiling solution.

The preferred amine resin is urea-formaldehyde. The melamine-formaldehyde resins are likewise suitable. These coating may be plasticized, as for example with alkyd resin, the proportion of the alkyd resin being kept sufficiently low as not to interfere with the polymerization of the amine resin.

A typical example of a phenol-formaldehyde prime coat is as follows:

| | Parts |
|---|---|
| Phenol | 100 |
| Formaldehyde (40% volume) | 90 to 120 |
| Sodium carbonate | 2 |

This resin is mixed with 25 per cent titanium dioxide by weight as a filler. After grinding the mixture is diluted with a solvent such as ethyl alcohol.

A typical formula for the urea-formaldehyde resin is as follows:

| | Parts |
|---|---|
| Urea | 204 |
| Thiourea | 44 |
| Formaldehyde | 972 |
| Aqua ammonia | 43¼ |

The above ingredients are heated to 102° C. and then 1200 cc. of butyl alcohol are added and the entire mixture is heated to 130°–140° C. The butyl alcohol which is evaporated during this process can later be reclaimed by distillation. The resulting resin formed is almost water white and is soluble in ethyl alcohol.

An example of an alkyd resin formula which can be used to plasticize the urea-formaldehyde resin described above is as follows:

| | Parts |
|---|---|
| Phthalic anhydride | 125.8 |
| Castor oil | 150 |
| Glycerine | 62 |
| Maleic anhydride | 14.6 |

Heat to 200° C. and hold for 85 minutes.

Use 60 parts of the urea-formaldehyde resin and 40 parts of the alkyd resin and grind with 35 per cent (by weight) titanium dioxide a white finish is produced which will bake to a hard, tough high gloss finish. Various colored pigments can be added to this white finish to produce pastel shades and other light stable colors.

This application process has been used successfully on washing machine agitators, washing machine tubs, drain boards, wringer assemblies, wash bowls, lavatory accessories, refrigerators, table tops, etc.

The foregoing detailed description has been given for clearness of understanding only, and no unnecessary limitations should be understood therefrom.

What I claim as new, and desire to secure by Letters Patent, is:

1. The method for coating a metal object which comprises applying a coating of an oil-free phenol-formaldehyde resin to the object, baking the coated object to completely polymerize the resin, then applying a coating of formaldehyde-amine resin of the class consisting of urea-formaldehyde resin and melamine resin to the object, and then baking the object to completely polymerize the last applied coating.

2. A coated object made by the method of claim 1.

3. The method of claim 1 in which the formaldehyde-amine resin is urea-formaldehyde resin.

4. The method of claim 1 in which the formaldehyde-amine resin is melamine resin.

CHARLES H. HEMPEL.

REFERENCES CITED

The following references are of record in the file of this patent:

UNITED STATES PATENTS

| Number | Name | Date |
|---|---|---|
| 982,230 | Baekeland | Jan. 24, 1911 |
| 1,863,799 | Loetscher | June 21, 1932 |
| 2,074,814 | Smith | Mar. 23, 1937 |
| 2,143,618 | Booty et al. | Jan. 10, 1939 |
| 2,198,939 | Hempel | Apr. 30, 1940 |
| 2,258,708 | Langkammerer | Oct. 14, 1941 |
| 2,312,296 | Hempel | Feb. 23, 1943 |
| 2,403,872 | Miller | July 9, 1946 |

OTHER REFERENCES

Simonds and Ellis: Handbook of Plastics (1943), pp. 456 and 459.